(12) United States Patent
Yamamoto et al.

(10) Patent No.: US 9,331,345 B2
(45) Date of Patent: May 3, 2016

(54) BONDED SHEET AND SHEET-MEMBER BONDING METHOD

(71) Applicant: NISSAN MOTOR CO., LTD., Yokohama-shi, Kanagawa (JP)

(72) Inventors: Masaya Yamamoto, Yokosuka (JP); Norifumi Horibe, Fujisaka (JP); Kei Ono, Yokohama (JP); Kenichi Toyoshima, Yokohama (JP); Takayuki Terasaki, Yokohama (JP)

(73) Assignee: NISSAN MOTOR CO., LTD., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/416,893

(22) PCT Filed: Jun. 24, 2013

(86) PCT No.: PCT/JP2013/067279
§ 371 (c)(1),
(2) Date: Jan. 23, 2015

(87) PCT Pub. No.: WO2014/017235
PCT Pub. Date: Jan. 30, 2014

(65) Prior Publication Data
US 2015/0214559 A1 Jul. 30, 2015

(30) Foreign Application Priority Data
Jul. 27, 2012 (JP) .................................. 2012-167134

(51) Int. Cl.
*H01M 8/24* (2006.01)
*H01M 8/02* (2016.01)
(Continued)

(52) U.S. Cl.
CPC ............... *H01M 8/0276* (2013.01); *B32B 3/30* (2013.01); *B32B 5/022* (2013.01); *B32B 7/12* (2013.01); *B32B 27/08* (2013.01); *B32B 27/12* (2013.01); *B32B 27/304* (2013.01); *B32B 27/32* (2013.01); *B32B 27/36* (2013.01); *B32B 37/10* (2013.01); *B32B 37/18* (2013.01); *H01M 8/0273* (2013.01); *B32B 2038/0052* (2013.01); *B32B 2307/54* (2013.01); *B32B 2307/724* (2013.01); *B32B 2307/726* (2013.01); *B32B 2457/18* (2013.01); *B32B 2581/00* (2013.01);
(Continued)

(58) Field of Classification Search
CPC ........................................................ H01M 8/24
See application file for complete search history.

(56) References Cited

U.S. PATENT DOCUMENTS

| 5,976,726 A | 11/1999 | Wilkinson et al. |
| 6,350,538 B1 | 2/2002 | Wilkinson et al. |

(Continued)

FOREIGN PATENT DOCUMENTS

| EP | 1296394 A1 | 3/2003 |
| JP | 2001297782 A | 10/2001 |

(Continued)

*Primary Examiner* — Jacob Marks
(74) *Attorney, Agent, or Firm* — Young Basile Hanlon & MacFarlane P.C.

(57) ABSTRACT

A bonded sheet to be applied to a membrane electrode assembly includes gaskets serving as a first sheet member and an electrolyte membrane serving as a second sheet member stacked on the gaskets. The gaskets each include a first bonded portion where grooves provided in a sheet surface direction at least partly face sheet end portions, and a second bonded portion having no groove. The electrolyte membrane is stacked on the gaskets in the first bonded portion and the second bonded portion.

3 Claims, 8 Drawing Sheets

(51) Int. Cl.

| | | |
|---|---|---|
| *B32B 3/30* | (2006.01) | |
| *B32B 37/10* | (2006.01) | |
| *B32B 37/18* | (2006.01) | |
| *B32B 5/02* | (2006.01) | |
| *B32B 7/12* | (2006.01) | |
| *B32B 27/08* | (2006.01) | |
| *B32B 27/12* | (2006.01) | |
| *B32B 27/30* | (2006.01) | |
| *B32B 27/32* | (2006.01) | |
| *B32B 27/36* | (2006.01) | |
| *H01M 8/10* | (2016.01) | |
| *B32B 38/00* | (2006.01) | |

(52) U.S. Cl.
CPC ..... *H01M 2008/1095* (2013.01); *Y02E 60/521* (2013.01); *Y10T 156/10* (2015.01)

(56) References Cited

U.S. PATENT DOCUMENTS

| | | | |
|---|---|---|---|
| 6,716,550 | B1 | 4/2004 | Kirby |
| 2002/0094470 | A1 | 7/2002 | Wilkinson et al. |
| 2002/0164518 | A1 | 11/2002 | Wilkinson et al. |
| 2004/0137303 | A1* | 7/2004 | Kuroki ............... H01M 8/0271 429/509 |
| 2006/0222813 | A1 | 10/2006 | Kato et al. |
| 2011/0236786 | A1* | 9/2011 | Iizuka ............... H01M 8/0273 429/482 |

FOREIGN PATENT DOCUMENTS

| | | | |
|---|---|---|---|
| JP | 2001522522 | A | 11/2001 |
| JP | 2006012677 | A | 1/2006 |
| JP | 2007030238 | A | 2/2007 |
| WO | 2004061032 | A1 | 7/2004 |
| WO | 2008073680 | A1 | 6/2008 |

* cited by examiner

BONDED SHEET AND SHEET-MEMBER BONDING METHOD

CROSS REFERENCE TO RELATED APPLICATION

The present application claims priority to Japanese Patent Application No. 2012-167134, filed Jul. 27, 2012, incorporated herein in its entirety.

TECHNICAL FIELD

The present invention relates to a fuel-cell gasket, a fuel-cell bonded assembly, and a sheet-member bonding method.

BACKGROUND

In response to recent social demands and trends in the context of energy and environment problems, fuel cells capable of operating even at ordinary temperature and obtaining high output density have attracted attention as a power supply for an electric car and a stationary power supply. A fuel cell is a clean power generation system in which an electrode reaction product is water in principle and which reduces the load on the global environment. In particular, a polymer electrolyte fuel cell (PEFC) is expected as a power supply for an electric car because it operates at relatively low temperature.

A membrane electrode assembly (MEA, hereinafter also referred to as MEA) included in a single cell of a fuel cell includes an electrolyte membrane where a catalyst layer is disposed, and frame-shaped gaskets disposed on opposite surfaces of the electrolyte membrane. The gaskets are positioned to surround the catalyst layer of the electrolyte membrane, and have the function of preventing fuel gas and oxidant gas supplied to the catalyst layer from leaking outside.

As a technique of suppressing remaining of bubbles between a plurality of sheet members when stacking (bonding) the sheet members, a resin sheet having through holes is known (see, for example, International Publication No. WO 2004/061032).

Even if the resin sheet of International Publication No. WO 2004/061032 is applied to the gaskets in the MEA, there is an area where bubbles cannot be removed by the through holes, and it is difficult to suppress remaining of the bubbles.

Owing to the remaining bubbles, the area surrounded by the gaskets sometimes communicates with the outside of the gaskets. Alternatively, projections are sometimes formed in the gaskets by the remaining bubbles, and the projections reduce the adhesion between the gaskets and separators. These may cause fuel gas and oxidant gas supplied to the catalyst layer to leak outside.

SUMMARY

The present invention has been made to solve the problems of the above-described related art, and an object of the invention is to provide a fuel-cell gasket and a fuel-cell bonded assembly that can suppress remaining bubbles and a sheet-member bonding method that can suppress remaining bubbles.

A fuel-cell gasket according to the present invention for achieving the above object is stacked on an outer peripheral edge of an electrolyte membrane and includes a sheet-shaped base material. The base material includes a first bonded portion where grooves provided in a sheet surface direction at least partly face an end portion of the base material and a second bonded portion having no groove. The fuel-cell gasket is stacked on the electrolyte membrane in the first bonded portion and the second bonded portion of the base material.

A fuel-cell gasket according to the present invention for achieving the above object is stacked on an outer peripheral edge of an electrolyte membrane and includes a sheet-shaped base material and an adhesive layer provided on the base material and containing a bonding member. The adhesive layer includes a first bonded portion where grooves provided in a sheet surface direction at least partly face an end portion of the base material and a second bonded portion having no groove. The fuel-cell gasket is stacked on the electrolyte membrane in the first bonded portion and the second bonded portion of the adhesive layer.

A fuel-cell bonded assembly according to the present invention for achieving the above object is stacked on an outer peripheral edge of an electrolyte membrane.

In a sheet-member bonding method according to the present invention for achieving the above object, a stack sheet is prepared by stacking, on a second sheet member, a first sheet member including a first bonded portion where grooves provided in a sheet surface direction at least partly face a sheet end portion and a second bonded portion having no groove. Next, a pressing member configured to pressurize the stack sheet in a stacking direction is pressed against the second bonded portion of the stack sheet. Then, the pressed pressing member is moved from the second bonded portion to the first bonded portion in a degassing process.

DETAILED DESCRIPTION OF THE EMBODIMENTS

An embodiment of the present invention will be described below with reference to the attached drawings. In the description of the drawings, the same elements are denoted by the same reference numerals, and redundant descriptions thereof are skipped. The dimensional ratios in the drawings are exaggerated for convenience of explanation, and are different from actual ratios.

Figure 1:
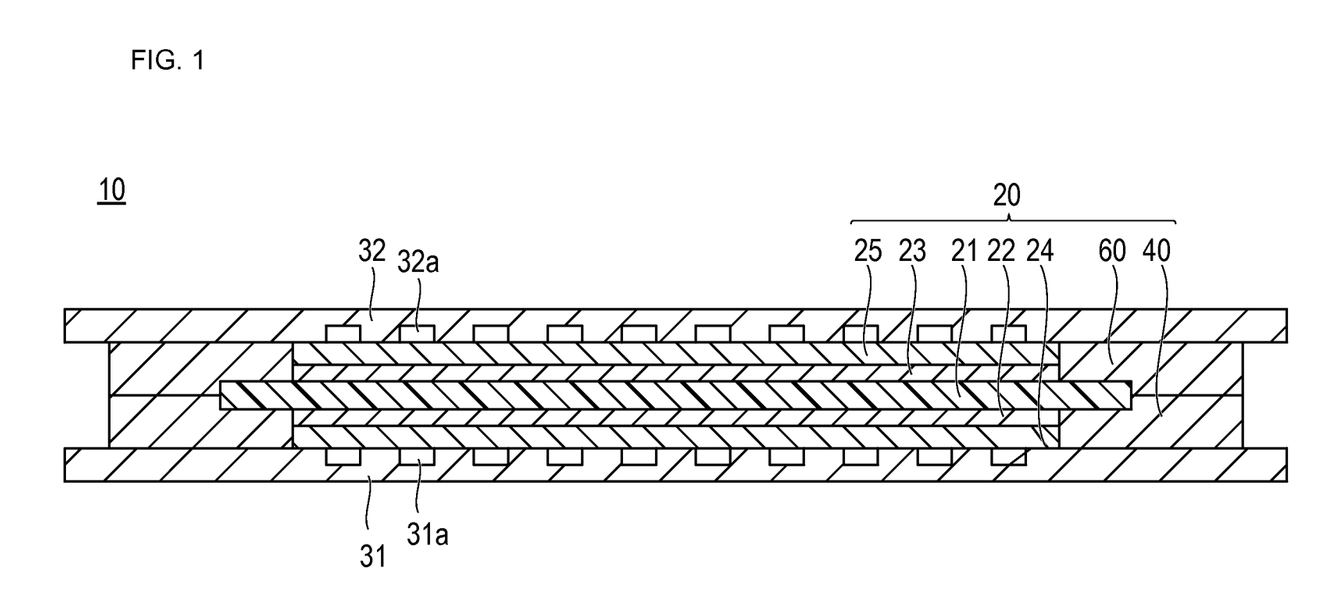
FIG. 1 is a cross-sectional view illustrating a cell structure of a fuel cell.
Figure 2:
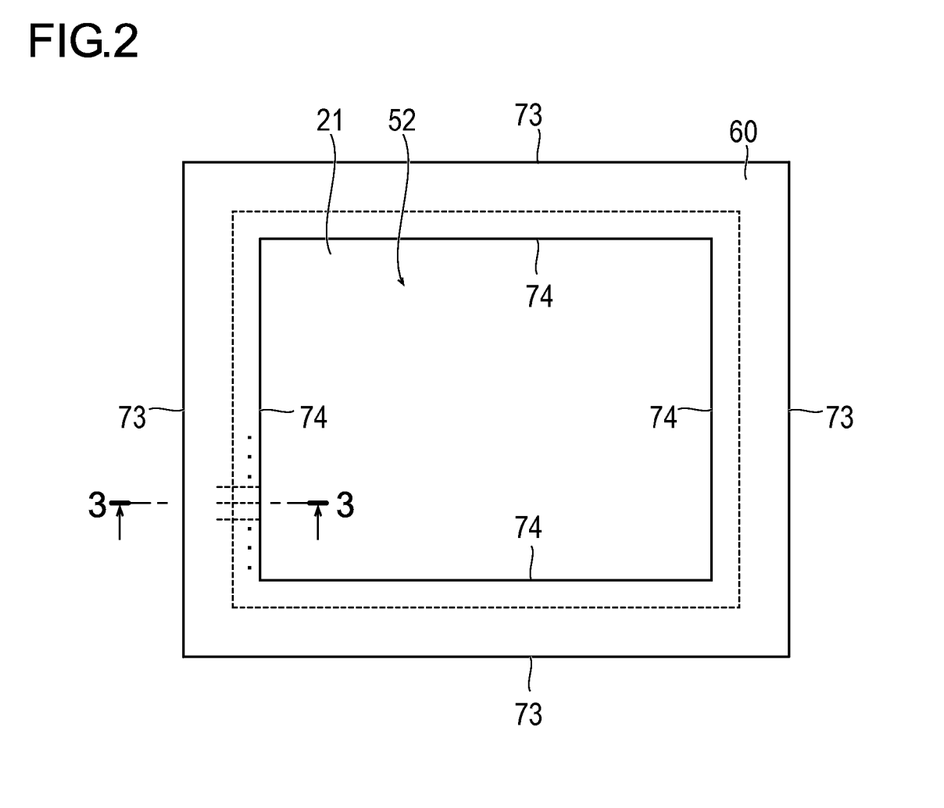
FIG. 2 is a plan view of an electrolyte membrane and gaskets illustrated in FIG. 1.

FIG. 1 is a cross-sectional view illustrating a cell structure of a fuel cell. FIG. 2 is a plan view of an electrolyte membrane 21 and gaskets 40 and 60 illustrated in FIG. 1.

Referring to FIG. 1, a single cell 10 is applied to, for example, a polymer electrolyte fuel cell (PEFC) using hydrogen as fuel, and includes an MEA 20 and separators 31 and 32.

The MEA 20 includes a polymer electrolyte membrane 21, catalyst layers 22 and 23, gas diffusion layers (GDLs) 24 and 25, a first gasket 40, and a second gasket 60.

The catalyst layer 22 contains a catalytic component, a conductive catalyst carrier for carrying the catalytic component, and a polymer electrolyte, serves as an anode catalyst layer in which an oxidation reaction of hydrogen proceeds, and is disposed on one side of the electrolyte membrane 21. The catalyst layer 23 contains a catalytic component, a conductive catalyst carrier for carrying the catalytic component, and a polymer electrolyte, serves as a cathode catalyst layer in which a reduction reaction of oxygen proceeds, and is disposed on the other side of the electrolyte membrane 21.

The electrolyte membrane 21 has the function of selectively allowing protons generated by the catalyst layer 22 to pass therethrough into the catalyst layer 23 and the function as a barrier that prevents mixture of fuel gas supplied to the anode side and oxidant gas supplied to the cathode side.

The gas diffusion layer 24 is an anode gas diffusion layer that diffuses the fuel gas supplied to the anode side, and is located between the separator 31 and the catalyst layer 22. The gas diffusion layer 25 is a cathode gas diffusion layer that diffuses the oxidant gas supplied to the cathode side, and is located between the separator 32 and the catalyst layer 23.

As illustrated in FIG. 2, the first and second gaskets 40 and 60 are each shaped like a frame having an aperture 52, and are disposed on opposite surfaces of an outer peripheral portion of the electrolyte membrane 21. The gasket 40 is positioned to surround the catalyst layer 22 (and the gas diffusion layer 24), and has the function of preventing the fuel gas supplied to the catalyst layer 22 from leaking outside. The gasket 60 is positioned to surround the catalyst layer 23 (and the gas diffusion layer 25), and has the function of preventing the oxidant gas supplied to the catalyst layer 23 from leaking outside.

The separators 31 and 32 have the function of electrically connecting the single cell 10 in series and the function as barriers for isolating the fuel gas, the oxidant gas, and a refrigerant. Each of the separators 31 and 32 has almost the same shape as that of the MEA 20, and is formed, for example, by press-working a stainless steel sheet. The stainless steel sheet is preferable because of its ease of complicated machining and high conductivity, and can be subjected to corrosive-resistant coating as necessary.

The separator 31 is an anode separator disposed on the anode side of the MEA 20, is opposed to the catalyst layer 22, and has grooves 31a located between the MEA 20 and the separator 31 to form gas passages. The grooves (gas passages) 31a are used to supply fuel gas to the catalyst layer 22.

The separator 32 is a cathode separator disposed on the cathode side of the MEA 20, is opposed to the catalyst layer 23, and has grooves 32a located between the MEA 20 and the separator 32 to form gas passages. The grooves (gas passages) 32a are used to supply oxidant gas to the catalyst layer 23.

Next, the materials, sizes, and so on of the constituent members will be described in detail.

To the electrolyte membrane 21, a fluorine-based electrolyte membrane formed of a perfluorocarbon sulfonic acid polymer, a hydrocarbon-based resin membrane containing a sulfonate group, or a porous membrane impregnated with an electrolytic component, such as phosphoric acid or ionic liquid, can be applied. Examples of perfluorocarbon sulfonic acid polymers are Nafion (registered trademark, manufactured by Du Pont Kabushiki Kaisha), Aciplex (registered trademark, manufactured by Asahi Kasei Corporation), and Flemion (registered trademark, manufactured by Asahi Glass Co., Ltd.). The porous membrane is formed of, for example, polytetrafluoroethylene (PTFE) or polyvinylidene difluoride (PVDF).

While the thickness of the electrolyte membrane 21 is not particularly limited, it is preferably 5 to 300 and more preferably 10 to 200 µm from the viewpoints of strength, durability, and output characteristics.

The catalytic component used in the catalyst layer (cathode catalyst layer) 23 is not particularly limited as long as it catalyzes a reduction reaction of oxygen. The catalytic component used in the catalyst layer (anode catalyst layer) 22 is not particularly limited as long as it catalyzes an oxidation reaction of hydrogen.

A specific catalytic component can be selected from, for example, metals such as platinum, ruthenium, iridium, rhodium, palladium, osmium, tungsten, lead, iron, chromium, cobalt, nickel, manganese, vanadium, molybdenum, gallium, and aluminum, and an alloy of these metals. To enhance catalytic activity, poisoning resistance to carbon monoxide or the like, heat resistance, etc., the catalytic component preferably contains at least platinum. The catalytic component to be applied does not always need to be equal between the cathode catalyst layer and the anode catalyst layer, and can be changed appropriately.

While the conductive carrier of the catalyst used in the catalyst layers 22 and 23 is not particularly limited as long as it has a specific surface area such as to carrier the catalytic component in a desired diffused state and a sufficient electronic conductivity as a current collector, a main component thereof is preferably carbon particles. For example, the carbon particles are formed of carbon black, activated carbon, coke, natural graphite, or artificial graphite.

The polymer electrolyte used in the catalyst layers 22 and 23 is not particularly limited as long as it has at least high proton conductivity. For example, a fluorine-based electrolyte containing fluorine atoms in the entirety or a part of a polymer backbone, or a hydrocarbon-based electrolyte that does not contain fluorine atoms in a polymer backbone is applicable. While the polymer electrolyte used in the catalyst layers 22 and 23 may be the same as or different from the polymer electrolyte used in the electrolyte membrane 21, it is preferably the same from the viewpoint of enhancement of adhesion of the catalyst layers 22 and 23 to the electrolyte membrane 21.

The thickness of the catalyst layers 22 and 23 is not particularly limited as long as it allows sufficient catalysis of the oxidation reaction of hydrogen (anode side) and the reduction action of oxygen (cathode side), and a thickness similar to the known thickness can be used. Specifically, the thickness of the catalyst layers is preferably 1 to 20 µm.

The gas diffusion layers 24 and 25 are formed by using, as a base material, a conductive and porous sheet-shaped material, for example, fabric, paper-like paper-making material, felt, or nonwoven fabric made of carbon such as glassy carbon. While the thickness of the base material is not particularly limited, it is preferably 30 to 500 µm from the viewpoints of mechanical strength and permeability of gas and water. In the gas diffusion layers 24 and 25, the base material preferably contains a water repellent from the viewpoints of water repellency and suppression of a flooding phenomenon.

Examples of the water repellent are a fluorine-based polymer material, such as PTFE, PVDF, polyhexafluoropropylene, or a tetrafluoroethylene-hexafluoropropylene copolymer (FEP), polypropylene, and polyethylene.

The material of the separators 31 and 32 is not limited to a stainless steel sheet, and other metal materials (for example, an aluminum plate or a clad material), or carbon, such as dense carbon graphite or a carbon plate, can be applied. When carbon is applied, the grooves 31a and 32a can be formed by cutting work or screen printing.

Next, a bonded sheet 70 to be applied to the MEA 20 of this embodiment will be described.

Figure 3:
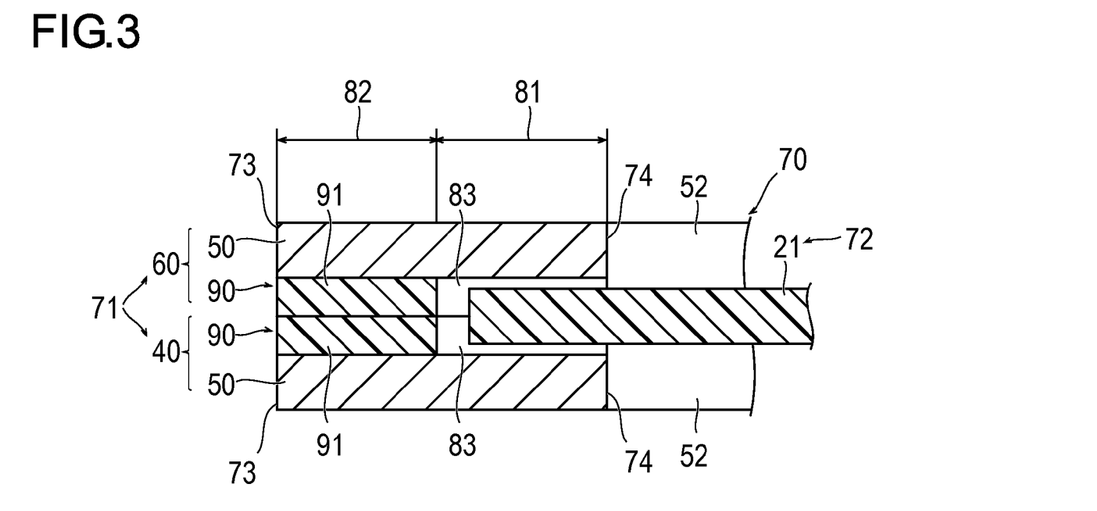
FIG. 3 is a cross-sectional view of a bonded sheet in which the gaskets and the electrolyte membrane are stacked, taken along line 3-3 of FIG. 2.
Figure 4:
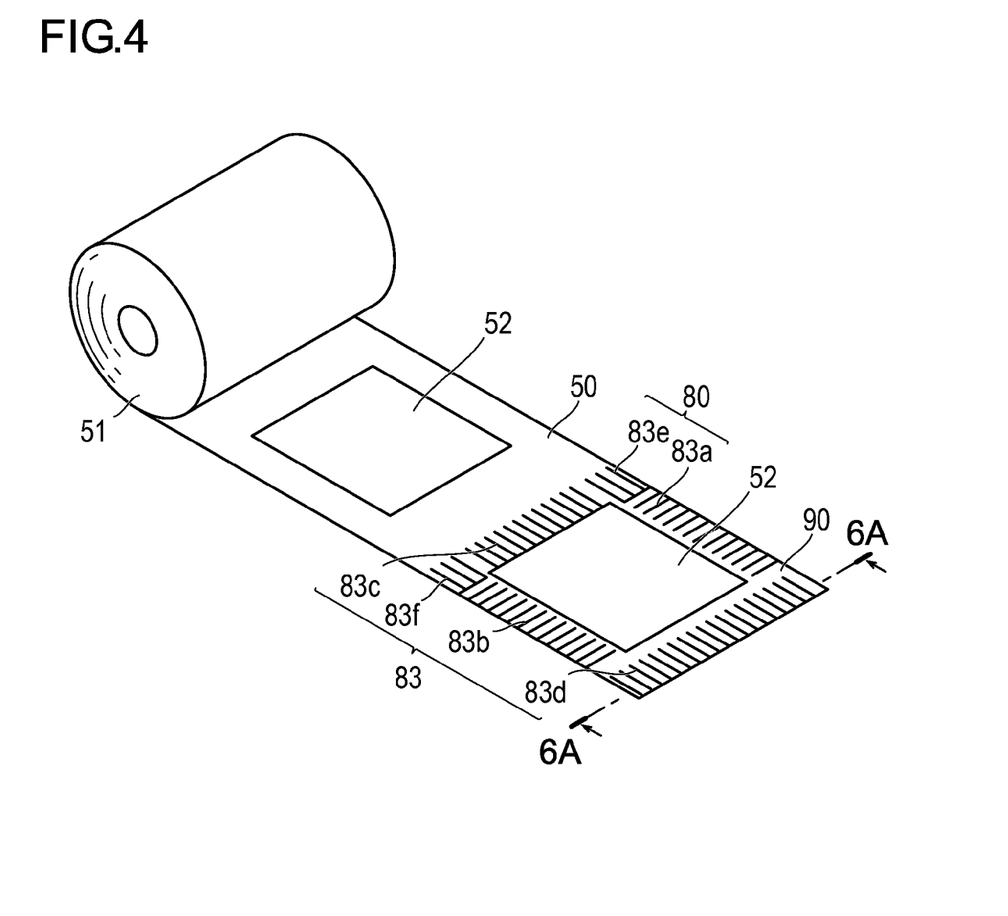
FIG. 4 is a perspective view illustrating a state in which an adhesive layer is provided on a base material that forms a body part of a gasket.
Figure 5:
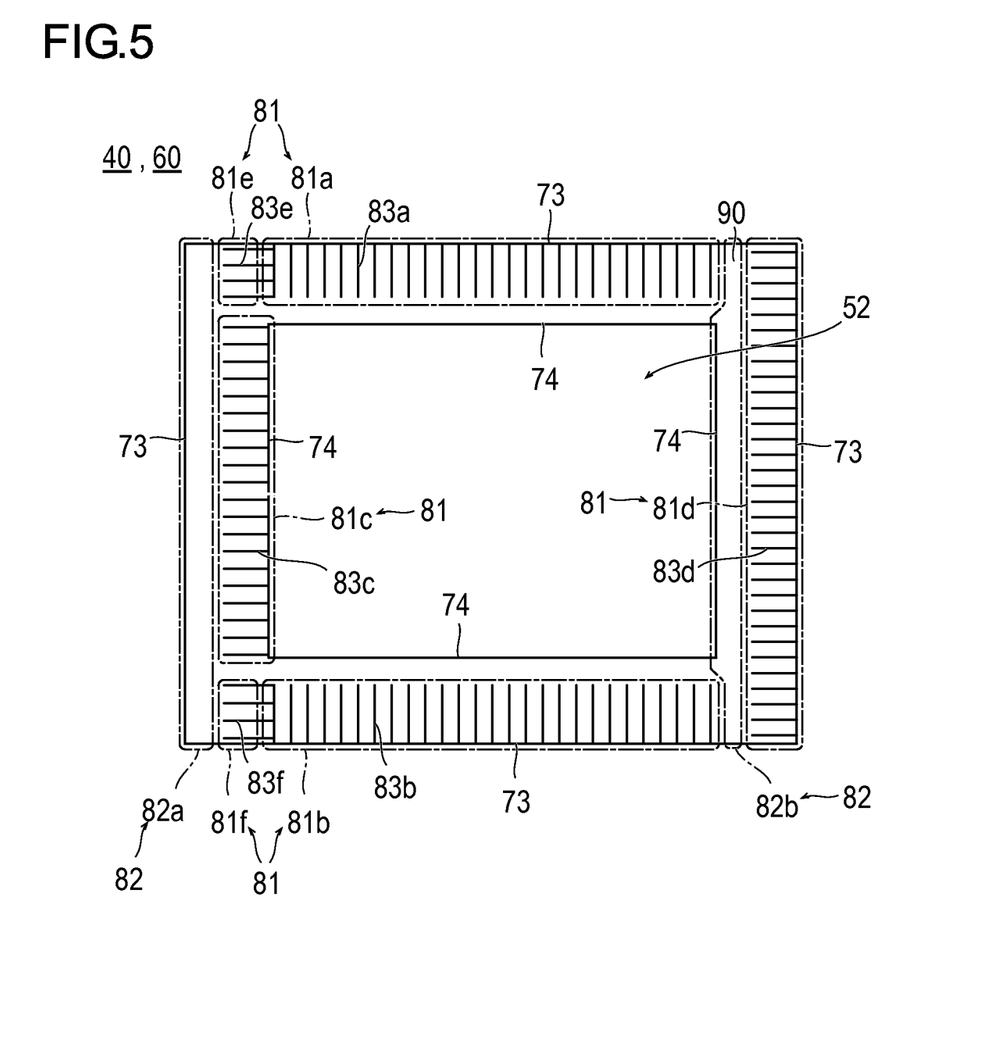
FIG. 5 is a plan view of the gasket whose adhesive layer side appears on the front side.
Figure 6A:
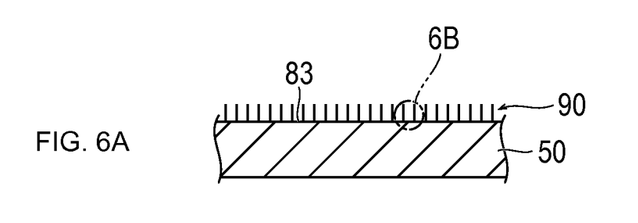
FIG. 6(A) is a cross-sectional view taken along line 6A-6A of FIG. 4.
Figure 6B:
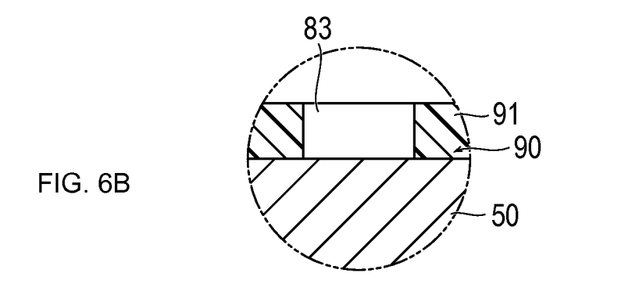
FIG. 6(B) is an enlarged view of a section 6B encircled by a two-dot chain line of FIG. 6(A), illustrating a cross-sectional shape of grooves in an enlarged manner.
Figure 6C:
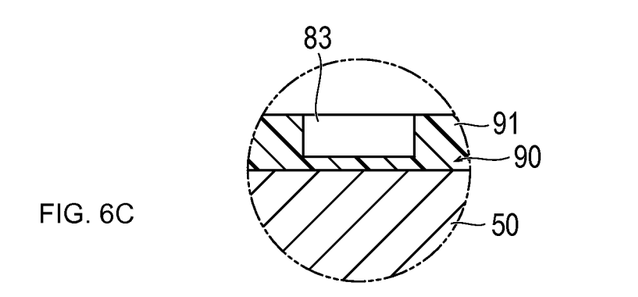
FIG. 6(C) is an enlarged view illustrating another cross-sectional shape of grooves.

FIG. 3 is a cross-sectional view of the bonded sheet 70 in which the gaskets 40 and 60 and the electrolyte membrane 21 are stacked, taken along line 3-3 of FIG. 2, FIG. 4 is a perspective view illustrating a state in which an adhesive layer 90 is provided on a base material 50 that forms a body part of each of the gaskets 40 and 60, and FIG. 5 is a plan view of the gasket 40 or 60 whose adhesive layer side appears on the front side. FIG. 6(A) is a cross-sectional view taken along line 6A-6A of FIG. 4, FIG. 6(B) is an enlarged view of a section 6B encircled by a two-dot chain line of FIG. 6(A), illustrating a cross-sectional shape of grooves 83 in an enlarged form, and FIG. 6(C) is an enlarged view illustrating another cross-sectional shape of grooves 83.

The bonded sheet 70 to be applied to the MEA 20 will be briefly described with reference to FIGS. 3 to 6. The bonded sheet 70 includes gaskets 40 and 60 serving as a first sheet member 71, and an electrolyte membrane 21 serving as a second sheet member 72 stacked on the gaskets 40 and 60. The gaskets 40 and 60 each include first bonded portions 81 (a general term for bonded portions 81a to 81f) where grooves 83 (a general term for grooves 83a to 83f) provided in a sheet surface direction at least partly face sheet end portions 73 and 74, and second bonded portions 82 (a general term for second bonded portions 82a and 82b) where grooves 83 are not provided. The electrolyte membrane 21 is stacked on the gaskets 40 and 60 in the first bonded portions 81 and the second bonded portions 82. In the illustrated example, the gaskets 40 and 60 are stacked on the electrolyte membrane 21 with adhesive layers 90 containing bonding members 91 being disposed therebetween. These components will be described in detail below.

The gaskets 40 and 60 each include a base material 50 that forms a body part, and an adhesive layer 90 provided on one surface of the base material 50. The base material 50 is long shape and is wound in a roll 51. The base material 50 has apertures 52 the electrolyte layers 22 and 23 face. The base material 50 is paid out from the roll 51 to form an adhesive layer 90 containing a bonding member 91. By applying the bonding member 91 from an application device, the adhesive layer 90 is formed. The base material 50 having the adhesive layer 90 is cut out in a predetermined size to be used as gaskets 40 and 60.

For example, the base material 50 of each of the gaskets 40 and 60 is formed of a rubber material, a fluorine-based polymer material, or a thermoplastic resin. Examples of rubber materials are fluororubber, silicon rubber, ethylene propylene rubber (EPDM), and polyisobutylene rubber. Examples of fluorine-based polymer materials are PTFE, PVDF, polyhexafluoropropylene, and FEP. Examples of thermoplastic resins are polyolefin and polyester. Polyester is, for example, polyethylene terephthalate (PET) or polyethylene naphthalate (PEN). While the thickness of the gaskets 40 and 60 is not particularly limited, it is preferably 10 μm to 2 mm, and more preferably 20 μm to 1 mm.

The bonding member 91 contains adhesive. While the adhesive is not particularly limited, for example, a hot-melt adhesive serving as a thermoplastic adhesive can be used.

In the adhesive layer 90, the first bonded portions 81 and the second bonded portions 82 are provided. As illustrated in an enlarged view of FIG. 6(B), the grooves 83 are provided only in the adhesive layer 90, but the grooves 83 are not provided in the base material 50. As a result, the mechanical strength of the gaskets 40 and 60 does not decrease. The forming manner of the grooves 83 is not limited to the manner in which the grooves 83 do not include the bonding member 91, as illustrated in FIG. 6(B). As illustrated in FIG. 6(C), the amount of bonding member 91 may be partly differed such that portions having a relatively small amount of bonding members 91 serve as the grooves 83.

The grooves 83 are provided to extend in the surface direction of the gaskets 40 and 60 (direction of the plane of paper of FIG. 5 or direction orthogonal to the plane of paper of FIG. 6). The grooves 83 partly face the sheet end portions 73 and 74. The sheet end portions include outer peripheral end portions 73 and inner peripheral end portions 74 defined by the aperture 52. More specifically, in FIG. 5, upper ends of upper grooves 83a in an enclosed area indicated by the symbol "81a" face an outer peripheral end portion 73, and lower ends thereof are located apart from an inner peripheral end portion 74. Lower ends of lower grooves 83b in an enclosed area indicated by the symbol "81b" face an outer peripheral end portion 73, and upper ends thereof are located apart from an inner peripheral end portion 74. Right ends of left grooves 83c in an enclosed area indicated by the symbol "81c" face an inner peripheral end portion 74, and left ends thereof are located apart from an outer peripheral end portions 73. Right ends of right grooves 83d in an enclosed area indicated by the symbol "81d" face an outer peripheral end portion 73, and left ends thereof are located apart from an inner peripheral end portion 74. Right ends of left upper grooves 83e in an enclosed area indicated by the symbol "81e" communicate with the upper grooves 83a, and face the outer peripheral end portion 73 via the upper grooves 83a. Right ends of left lower grooves 83f in an enclosed area indicated by the symbol "81f" communicate with the lower grooves 83b, and face the outer peripheral end portion 73 via the lower grooves 83b.

Although the lower ends of the upper grooves 83a and the upper ends of the lower grooves 83b may face the inner peripheral end portions 74, they are provided apart from the inner peripheral end portions 74 in this embodiment. This structure is adopted on the ground that passages through which gas is pushed out are ensured because the upper ends of the upper grooves 83a and the lower ends of the lower grooves 83b face the outer peripheral end portions 73 and that gas existing close to the inner peripheral end portions 74 can be pushed out from the inner peripheral end portions 74 without any passage. Further, even if the grooves 83a and 83b are left without being crushed, the inside and the outside of the aperture 52 do not communicate with each other. This can reliably prevent fuel gas and oxidant gas from leaking outside.

The enclosed areas indicated by the symbols "81a" to "81f" correspond to the first bonded portions 81 including the grooves 83 (83a to 83f). The enclosed areas indicated by the symbols "82a" and "82b" correspond to the second bonded portions 82 that do not include the grooves 83. In FIG. 5, the second bonded portions 82 are provided at two right and left positions, that is, on the left side of the left upper, left, and left lower grooves 83 and the left side of the right grooves 83.

The electrolyte membrane 21 is stacked on the gaskets 40 and 60 in the first bonded portions 81 and the second bonded portions 82 to constitute the bonded sheet 70. In the manner illustrated in FIG. 3, the first bonded portions 81 extend to the outside of an area overlapping with the electrolyte membrane 21, and the second bonded portions 82 are provided in an area where the gaskets 40 and 60 are stacked directly. The portion where the gaskets 40 and 60 are directly stacked also constitutes the bonded sheet 70. This portion includes the first gasket 40 serving as the first sheet member 71 and the second gasket 60 stacked as the second sheet member 72 on the first gasket 40.

Figure 7A:
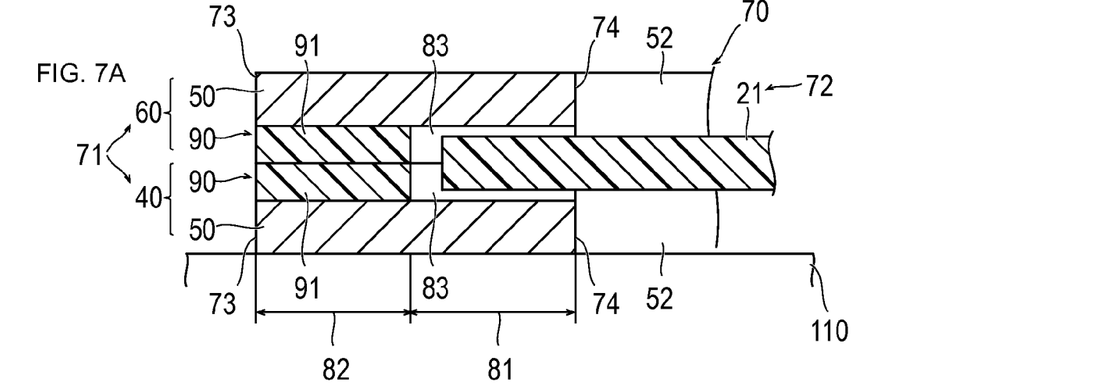
FIGS. 7(A) to 7(C) are explanatory views illustrating a procedure for bonding the gaskets and the electrolyte membrane.

A stack sheet in which the gaskets 40 and 60 and the electrolyte membrane 21 are stacked, that is, the bonded sheet 70 is pressurized in the stacking direction by a pressing member 100 (see FIG. 7). For example, the pressing member 100 is formed by a rotatable roller member 101. The moving direction of the pressing member 100 is the right direction in FIG. 5. The illustrated grooves 83 (83a to 83f) include a form such as to extend in the direction parallel to the moving direction of the pressing member 100 and a form such as to extend to intersect the moving direction of the pressing member 100. The grooves 83c, 83d, 83e, and 83f are provided in the former form, and the grooves 83a and 83b are provided in the latter form. The second bonded portion 82 on the left side is used as a contacting area against which the pressing member 100 is pressed. The second bonded portion 82 on the right side is used as a contacting area against which the moved pressing member 100 is pressed.

Next, a description will be given of a procedure for bonding the gaskets 40 and 60 and the electrolyte membrane 21.

Figure 7B:
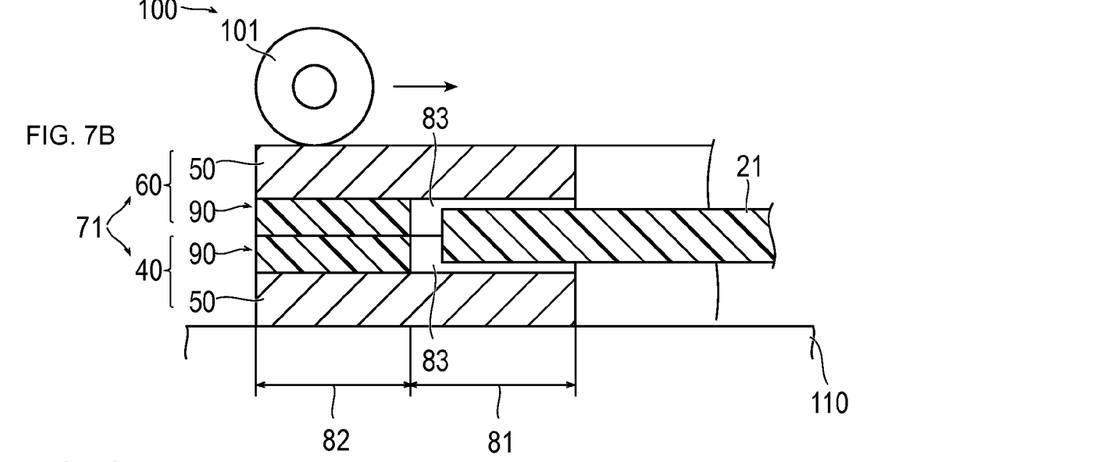
Figure 7C:
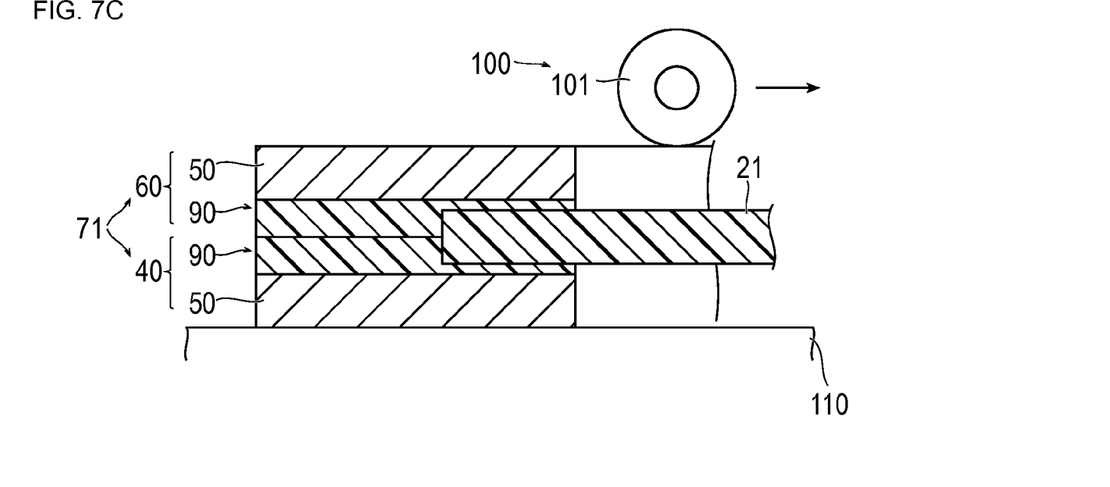

FIGS. 7(A) to 7(C) are explanatory views illustrating the procedure for bonding the gaskets 40 and 60 and the electrolyte membrane 21. For convenience of explanation, the grooves 83 are exaggeratingly illustrated in the figures.

First, as illustrated in FIG. 7(A), a stack sheet 70 is prepared by placing, on an electrolyte membrane 21, gaskets 40 and 60 including first bonded portions 81 having grooves 83 and second bonded portions 82 having no grooves 83. The stack sheet 70 is set on a mounting table 110.

Next, as illustrated in FIG. 7(B), a pressing member 100 for pressurizing the stack sheet 70 in the stacking direction is pressed against the second bonded portion 82 of the stack sheet 70.

Next, as illustrated in FIG. 7(C), the pressed pressing member 100 is moved from the second bonded portion 82 toward the first bonded portion 81 to carry out a degassing process of pushing out gas existing between the gaskets 40 and 60 and the electrolyte membrane 21.

By moving the pressing member 100, gas existing around the left grooves 83c is pushed out from the inner peripheral end portion 74 through the left grooves 83c. Gas existing around the left upper grooves 83e and the upper grooves 83a is pushed out from the upper outer peripheral end portion 73 through the upper grooves 83a. Gas existing around the left lower grooves 83f and the lower grooves 83b is pushed out from the lower outer peripheral end portion 73 through the lower grooves 83b. Gas existing between the lower ends of the upper grooves 83a and the inner peripheral end portion 74 and gas existing between the upper ends of the lower grooves 83b and the inner peripheral end portion 74 exist close to the inner peripheral end portions 74, and therefore, are pushed out from the inner peripheral end portions 74 even when no grooves 83 are provided.

When the pressing member 100 further moves and passes over the aperture 52, it contacts on the right second bonded portion 82 illustrated in FIG. 5. As the pressing member 100 further moves, gas existing around the right grooves 83d is pushed out from the right outer peripheral end portion 73 through the right grooves 83d.

When the pressing member 100 moves in the first bonded portions 81, the gas is pushed out and the grooves 83 in the first bonded portions 81 are crushed. Since the grooves 83 are crushed, fuel gas and oxidant gas do not flow into the first bonded portions 81.

All of the grooves 83 are formed in a shape such as not to allow the inside and the outside of the aperture 52 to communicate with each other. Therefore, even if the grooves 83 are left without being crushed, the inside and the outside of the aperture 52 do not communicate with each other. This can reliably prevent the fuel gas and the oxidant gas from leaking outside.

When the pressing member 100 pressed against the first bonded portion 81 having the grooves 83 is moved from the first bonded portions 81 in the degassing process, the grooves 83 may be left on a side of the pressing member 100 opposite from the moving direction without being crushed, and bubbles may remain between the gaskets 40 and 60 and the electrolyte membrane 21. In contrast, in this embodiment, the second bonded portion 82 having no groove 83 is used as the contacting area for the pressing member 100. Hence, even when the pressed pressing member 100 is moved, bubbles can be prevented from remaining in the second bonded portion 82.

Since remaining of bubbles can be suppressed, the area surrounded by the gaskets 40 and 60 does not communicate with the outside of the gaskets 40 and 60. Further, projections are not formed in the gaskets 40 and 60 by remaining bubbles, and the adhesion between the gaskets 40 and 60 and the separators does not decrease. Therefore, it is possible to suppress remaining of bubbles and to prevent fuel gas and oxidant gas supplied to the catalyst layers from leaking outside.

The technique of forming a slit in an adhesive layer of a wallpaper is known. This allows bubbles to be easily pushed out through the slit when hanging the wallpaper, and spreads the remaining bubbles in the slit so that projections do not appear on the surface. Since the slit of the wallpaper is not a mechanism that is intended to completely remove the bubbles, the bubbles may communicate with each other from end to end of the slit. In the application as the wallpaper, even if bubbles remain in the slit, they are not noticeable, and cause no trouble. However, if bubbles communicate with each other from end to end in the gaskets 40 and 60, they cause a problem in that fuel gas and oxidant gas supplied to the catalyst layers leak outside. Therefore, the gaskets 40 and 60 have to include a mechanism that can properly get out and remove bubbles remaining between the gaskets 40 and 60 and the electrolyte membrane 21 and between the gaskets 40 and 60. According to the above-described embodiment, this requirement can be satisfied.

As described above, the bonded sheet 70 of this embodiment to be applied to the MEA 20 includes the gaskets 40 and 60 each serving as the first sheet member 71 including the first bonded portions 81 where the grooves 83 provided in the sheet surface direction at least partly face the sheet end portions (outer peripheral end portions 73 and inner peripheral end portions 74) and the second bonded portions 82 having no groove 83, and the electrolyte membrane 21 serving as the second sheet member 72 stacked on the gaskets 40 and 60 in the first bonded portions 81 and the second bonded portions 82. Since the grooves 83 at least partly face the sheet end portions 73 and 74, gas existing between the gaskets 40 and 60 and the electrolyte membrane 21 can be pushed out from the sheet end portions 73 and 74 through the grooves 83. Further, the second bonded portions 82 having no groove 83 can be used as the contacting area against which the pressing member 100 for pressurization in the stacking direction is pressed. These can provide the bonded sheet 70 that can suppress remaining of bubbles. Since remaining of the bubbles can be suppressed, fuel gas and oxidant gas supplied to the catalyst layers 22 and 23 can be prevented from leaking outside.

The gaskets 40 and 60 and the electrolyte membrane 21 are stacked with the adhesive layer 90 containing the bonding member 91 being disposed therebetween. The grooves 83 can be formed only in the adhesive layer 90 such that they are not provided in the base material 50 of each of the gaskets 40 and 60. This can prevent degradation of mechanical strength of the gaskets 40 and 60.

The sheet-member bonding method according to this embodiment includes the process of preparing the bonded sheet 70 by placing the gaskets 40 and 60 serving as the first sheet member 71 on the electrolyte membrane 21 serving as the second sheet member 72, the process of pressing the pressing member 100 for pressurizing the bonded sheet 70 in the stacking direction against the second bonded portion 82 of the bonded sheet 70, and the degassing process of moving the pressed pressing member 100 from the second bonded portion 82 toward the first bonded portion 81. Since the grooves 83 at least partly face the sheet end portions 73 and 74, gas existing between the gaskets 40 and 60 and the electrolyte membrane 21 can be pushed out from the sheet end portions 73 and 74 through the grooves 83 in the degassing operation. Further, the second bonded portion 82 having no groove 83 can be used as the contacting area against which the pressing member 100 for pressurization in the stacking direction is pressed. Thus, it is possible to provide the sheet-member bonding method that can suppress remaining of bubbles. Since remaining of the bubbles can be suppressed, fuel gas and oxidant gas supplied to the catalyst layers 22 and 23 can be prevented from leaking outside.

Since the grooves 83 in the first bonded portions 81 are crushed when the pressing member 100 moves in the first bonded portions 81, the fuel gas and the oxidant gas do not flow into the first bonded portions 81.

The grooves 83 are provided in the form such as to extend parallel to the moving direction of the pressing member 100 and the form such as to extend to intersect the moving direction of the pressing member 100. Hence, gas existing between the gaskets 40 and 60 and the electrolyte membrane 21 can be reliably pushed out from the sheet end portions 73 and 74 through the grooves 83.

Since the second bonded portion 82 is disposed at the downstream position in the moving direction of the pressing member 100, even when the aperture 52 exists in the moving direction of the pressing member 100, the second bonded portion 82 can be used as the contacting area for the pressing member 100. This can suppress remaining of bubbles.

The pressing member 100 is the rotatable roller member 101, and can reliably push out gas, which exists between the gaskets 40 and 60 and the electrolyte membrane 21, from the sheet end portions 73 and 74 through the grooves 83 in the degassing process of moving (rolling) the pressing member 100.

The second sheet member 72 is the polymer electrolyte membrane 21 on which the electrocatalyst layers are provided, and the first sheet member 71 is the frame-shaped gaskets 40 and 60 bonded to the outer peripheral edge of the polymer electrolyte membrane 21. Hence, remaining of bubbles between the gaskets 40 and 60 and the electrolyte membrane 21 can be suppressed. As a result, fuel gas and oxidant gas supplied to the catalyst layers 22 and 23 can be prevented from leaking outside.

(Modification of Sheet Member)

Figure 8A:
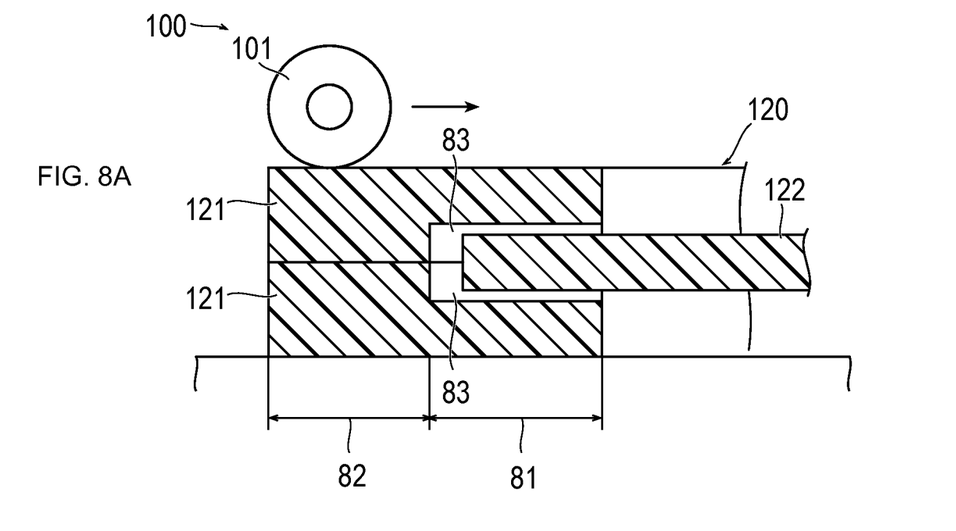
FIGS. 8(A) and 8(B) include cross-sectional views illustrating modifications of sheet members.
Figure 8B:
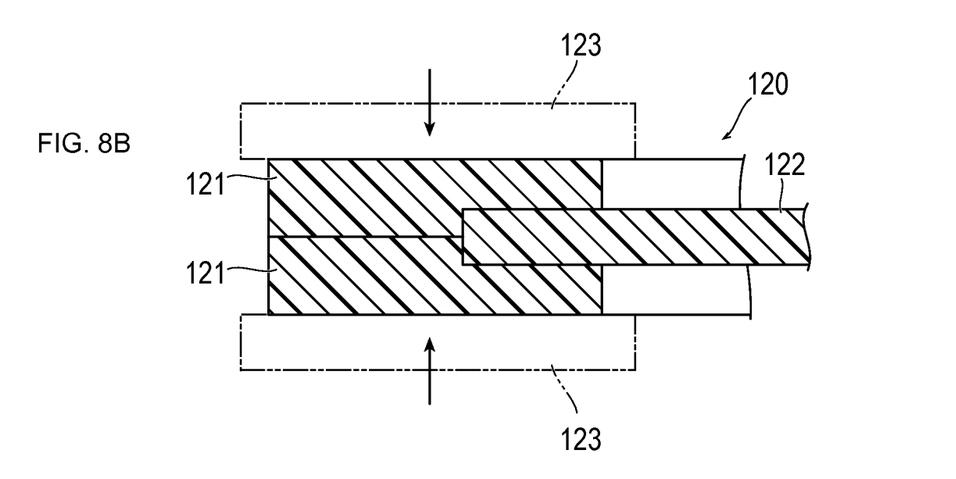

FIG. 8 includes cross-sectional views of a modification of a sheet member.

While the bonded sheet 70 in which the first sheet member 71 (gaskets 40 and 60) and the second sheet member 72 (electrolyte membrane 21) are stacked with the adhesive layer 90 including the bonding member 91 being disposed therebetween has been illustrated, the present invention is not limited to this case. The bonding material is not essential, and the sheet members themselves may be thermally fused.

Similarly to the above-described embodiment, a bonded sheet 120 includes first sheet members 121 each having a first bonded portion 81 with grooves 83 and a second bonded portion 82 with no groove 83, and a second sheet member 122 stacked on the first sheet members 121 in the first bonded portion 81 and the second bonded portion 82. The first sheet members 121 and the second sheet member 122 are formed of a thermally fusible material.

A sheet-member bonding method in this case further includes a process of thermally fusing the first sheet members 121 and the second sheet member 122 after the degassing operation. In the thermally fusing operation, a pressing device 123 is used to pressurize and heat the first sheet members 121 and the second sheet member 122. In thermal fusing, grooves 83 in the first bonded portion 81 are crushed. Since the grooves 83 are crushed, gas does not flow into the first bonded portion 81.

(Modification of Grooves 83)

Figure 9:
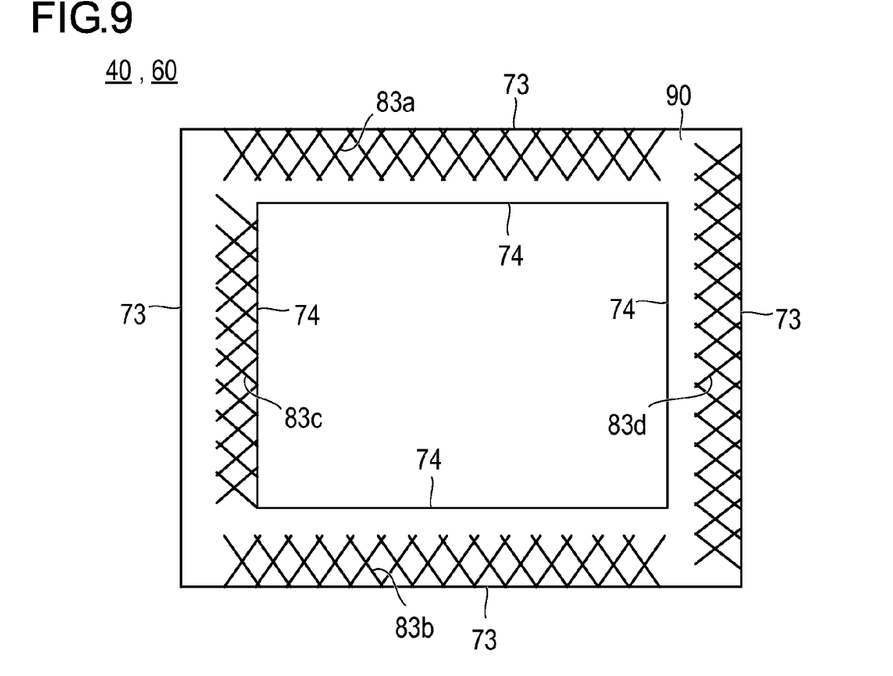
FIG. 9 is a cross-sectional view illustrating modifications of grooves.

FIG. 9 is a cross-sectional view illustrating a modification of grooves 83.

The form in which the grooves 83 are provided is not limited to the form such that the grooves 83 extend parallel to the moving direction of the pressing member 100 and the form such that the grooves 83 extend to intersect the moving direction of the pressing member 100. The grooves 83 can be provided in an appropriate form as long as they allow gas, which exists between the first sheet members 71 and the second sheet member 72, to be pushed out from the sheet end portions 73 and 74. For example, as illustrated in FIG. 9, the grooves 83 (83a to 83f) may be provided in a form such that grooves extend to intersect each other.

(Modification of Pressing Member 100)

Figure 10:
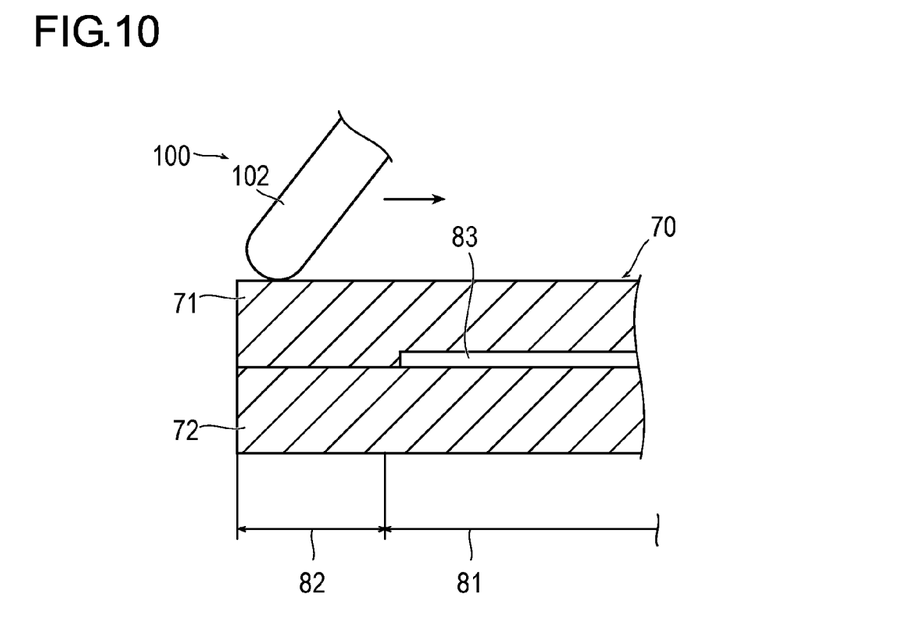
FIG. 10 is a cross-sectional view illustrating a modification of a pressing member.

FIG. 10 is a cross-sectional view illustrating a modification of the pressing member 100.

The pressing member 100 is not limited to the case in which it is formed by the rotatable roller member 101. The pressing member 100 can be formed by an appropriate member as long as it can push out gas, which exists between the first sheet members 71 and the second sheet member 72, from the sheet end portions 73 and 74. For example, as illustrated in FIG. 10, the pressing member 100 may be a squeegee formed by a blade member 102.

(Other Modifications)

While the gaskets 40 and 60 and the electrolyte membrane 21 in the MEA 20 are illustrated as the bonded sheet 70, the first sheet members 71 and the second sheet member 72 are, needless to say, not limited to this case. The first sheet members 71 and the second sheet member 72 can be widely applied to the bonded sheet 70 that is required to suppress remaining of bubbles between the stacked sheet members 71 and 72.

The invention claimed is:

1. A fuel-cell gasket to be stacked on an outer peripheral edge of an electrolyte membrane, the fuel-cell gasket comprising:
   a sheet-shaped base material, wherein the base material includes a first bonded portion where grooves provided in a sheet surface direction at least partly face an end portion of the base material and a second bonded portion having no groove, and wherein the fuel-cell gasket is stacked on the electrolyte membrane in the first bonded portion and the second bonded portion of the base material.

2. A fuel-cell gasket to be stacked on an outer peripheral edge of an electrolyte membrane, the fuel-cell gasket comprising:

a sheet-shaped base material; and an adhesive layer provided on the base material and containing a bonding member, wherein the adhesive layer includes a first bonded portion where grooves provided in a sheet surface direction at least partly face an end portion of the base material and a second bonded portion having no groove, and wherein the fuel-cell gasket is stacked on the electrolyte membrane in the first bonded portion and the second bonded portion of the adhesive layer.

3. A fuel-cell bonded assembly in which the fuel-cell gasket according to claim 1 is stacked on an outer peripheral edge of an electrolyte membrane.

* * * * *